Patented July 30, 1946

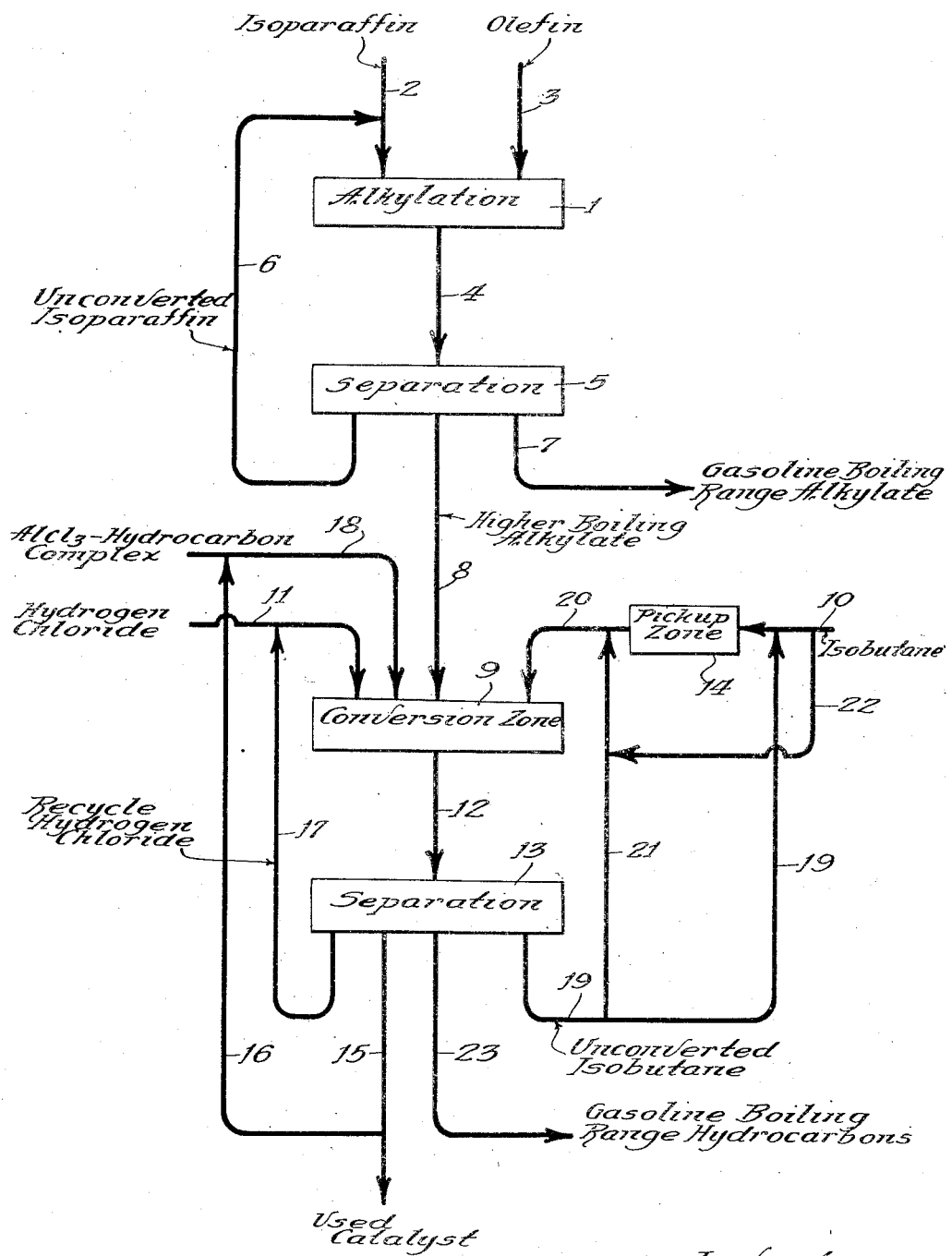

2,404,934

UNITED STATES PATENT OFFICE 2,404,934

CONVERSION OF HYDROCARBONS

Ralph B. Thompson, Riverside, Ill., assignor to Universal Oil Products Company, Chicago, Ill., a corporation of Delaware Application June 25, 1943, Serial No. 492,215

10 Claims. (Cl. 260—683.4)

This invention is concerned with the conversion of relatively high boiling hydrocarbons to more valuable products boiling in the gasoline range. A feature of the invention is the use of a particular catalyst for effecting the conversion reaction.

The alkylation of isoparaffins with olefins in the presence of a suitable alkylating catalyst to produce substantially saturated hydrocarbons which may be employed as blending agents in aviation gasoline and other motor fuels has assumed a position of considerable commercial importance during the past several years. Among the alkylation catalysts which have been proposed are sulfuric acid, hydrogen fluoride, phosphoric acid, aluminum chloride and various other metal halides, halosulfonic acids, etc. The alkylation process is generally practiced on a commercial scale by reacting isobutane or isopentane with a mono olefin such as ethylene, propylene, butylene, amylene or mixtures thereof. However, the reaction is broadly applicable to higher molecular weight hydrocarbons, e. g., any branched chain paraffin containing at least one tertiary carbon atom per molecule may be employed as the isoparaffin reactant. Higher molecular weight olefins may also be utilized including liquid polymers of the lower boiling olefins.

The alkylation reaction which is perhaps of greatest commercial importance comprises the interaction of isobutane with butylenes in the presence of sulfuric acid or hydrogen fluoride to produce branched chain octanes having valuable antiknock characteristics. Another alkylation reaction which has become important commercially comprises the interaction of isobutane with ethylene in the presence of a suitable catalyst such as aluminum chloride to produce valuable hexane fractions.

In all such alkylation processes the reaction is not completely selective, and substantial amounts of higher boiling products are usually obtained, i. e., products which are higher boiling than the theoretical primary alkylation products formed by the interaction of one mol of isoparaffin with one mol of olefin. Thus, in the alkylation of isobutane with butylenes in the presence of sulfuric acid or hydrogen fluoride an appreciable quantity of alkylate boiling above the octane range is formed. The fraction boiling above about 160° C. is generally less valuable than the lower boiling alkylate. Similarly in the alkylation of isobutane with ethylene in the presence of aluminum halide catalysts there is obtained an appreciable quantity of product boiling above the hexane range. The higher boiling alkylation products are commonly referred to as "heavy alkylate" or "alkylate bottoms." These higher boiling alkylation products are usually unsuitable or considerably less desirable for aviation gasoline purposes and must therefore be disposed of in some other manner. In some cases the higher boiling alkylation products may be utilized in automobile fuels wherein higher boiling hydrocarbons can be tolerated, but in many instances the products have such high boiling ranges that their use in automobile fuels is precluded.

One object of the present invention is to provide a method for converting isoparaffin-olefin alkylation products which boil above the desired range to lower boiling and more valuable products.

Another object of the invention is to convert isoparaffin-olefin alkylation products which boil above the gasoline range to hydrocarbons which are within the gasoline boiling range.

A still further object of the invention is to provide a method for converting alkylate bottoms to more valuable $C_6$ hydrocarbons such as 2,3-dimethylbutane.

Broadly the invention comprises reacting relatively high boiling isoparaffin-olefin alkylation products with isobutane in the presence of an aluminum chloride-hydrocarbon complex catalyst to produce lower boiling and more valuable saturated hydrocarbons.

In one specific embodiment the invention comprises reacting isobutane-ethylene alkylation products boiling above about 65° C. with isobutane in the presence of a liquid aluminum chloride-hydrocarbon complex and hydrogen chloride to produce lower boiling hydrocarbons comprising 2,3-dimethylbutane.

The catalyst which is employed in my invention to effect the interaction of relatively high boiling isoparaffin-olefin alkylation products with isobutane comprises a liquid aluminum chloride-hydrocarbon complex. This complex is preferably prepared by contacting an olefin, an isoparaffin, hydrogen chloride and aluminum chloride under alkylating conditions. One convenient method of operation consists of preparing the aluminum chloride-hydrocarbon complex outside of the reaction system and then charging the preformed catalyst to the conversion zone as an initial catalyst supply. The reaction of alkylate bottoms with isobutane in the presence of the liquid catalyst is preferably carried out in a mechanically agitated conversion zone wherein the hydrocarbon reactants and catalyst are subjected to intimate contact. In general, however, any suitable contacting equipment may be employed, e. g., any of the conventional reactors employed for the alkylation of hydrocarbons. The operation is conducted on a continuous scale by introducing the hydrocarbon reactants, the liquid aluminum chloride-hydrocarbon complex, and hydrogen chloride into the conversion zone and continuously withdrawing reaction mixture into a settling zone wherein an upper hydrocarbon layer is separated from a lower catalyst layer. The upper hydrocarbon layer is withdrawn and subjected to fractionation for the recovery of desired products. A substantial portion of the catalyst layer may be recycled to the conversion zone and another portion thereof is withdrawn from the system continuously or intermittently.

In many cases after supplying an initial charge of preformed catalyst to the conversion zone the quantity and activity of the catalyst in the system can thereafter be regulated by introducing into the conversion zone controlled amounts of fresh aluminum chloride. The aluminum chloride thus introduced interacts with the hydrocarbon reactants to form additional quantities of aluminum chloride-hydrocarbon complex or is otherwise incorporated into the complex already present in the conversion system whereby to maintain the active aluminum chloride content of the catalyst within any desired range. Satisfactory results are usually obtained when the complex has an aluminum chloride content of from about 60% to about 85% by weight although in some cases it may be desirable to exceed this range in either direction. The preferred method of introducing controlled amounts of aluminum chloride into the conversion zone consists in passing a substantially inert carrier fluid through a pickup zone which contains a bulk supply of fresh aluminum chloride and which is maintained under conditions of temperature and pressure suitable for dissolving a substantial portion of aluminum chloride in the carrier fluid. Regulated quantities of this solution of aluminum chloride in the carrier fluid are then supplied to the conversion zone. Although a variety of carrier fluids may be employed provided they are substantially non-reactive with the aluminum chloride in the pickup zone, it is generally most convenient to employ a portion of the isobutane charge as the pickup medium.

It will be apparent that other methods of handling and replenishing the aluminum chloride-hydrocarbon complex may be employed without departing from the essential scope of the present invention.

The operation of the invention will become more evident by reference to the accompanying drawing which is a schematic flow diagram illustrating the relationship of the several steps of the invention.

Zone 1 represents a conventional alkylation system to which isoparaffin hydrocarbons are charged through line 2 and olefins are introduced through line 3. Since in its broadest embodiment the invention is applicable to the treatment of high boiling isoparaffin-olefin alkylation products from any convenient source, the drawing is not limited to the use of any particular isoparaffin and olefin nor to the use of any particular alkylation catalyst. The hydrocarbon reaction products pass through line 4 to separation zone 5 which may comprise any convenient arrangement of separating means such as fractionators, solvent extraction zones, etc. Unconverted isoparaffin reactants are recycled to the alkylation zone through line 6, and gasoline boiling range alkylation products are recovered through line 7. The higher boiling alkylation products or alkylate bottoms are withdrawn through line 8 for subsequent treatment according to the method of the present invention.

The alkylate bottoms are introduced into conversion zone 9 and contacted therein with the aluminum chloride-hydrocarbon complex catalyst introduced by way of line 18. Hydrogen chloride to the extent of from about ½% to about 10% by weight of the hydrocarbons charged is introduced through line 11 and isobutane is added from line 20. Fresh isobutane may be added to the system through line 10 and pickup zone 14 containing a bulk supply of fresh aluminum chloride. The aluminum chloride in the pickup zone is preferably present as a granular solid. If desired, however, the aluminum chloride may be present as a liquid, a binary or ternary mixture with other metal halides or as an adsorbed layer on an adsorbent material such as firebrick, silica gel, etc. The temperature, pressure and quantity of isobutane passing through zone 14 are controlled to carry over the desired amount of aluminum chloride as hereinbefore set forth. Although only one pickup zone is shown, it will be apparent that a plurality of pickup zones may be provided and employed alternately. A portion or all of the fresh isobutane charge may be bypassed around the pickup zone by means of lines 22, 21, and 20 as shown.

The reaction in conversion zone 9 may be conducted at a temperature of from about 10° C. to about 100° C. The pressure should be sufficiently high to maintain the reactants in substantially the liquid phase, e. g., from about 50 to about 500 pounds per square inch dependent upon the temperature and upon other factors. Some latitude is allowable in choice of reaction temperature since the activity of the catalyst is responsive to some degree to the temperature.

The products from the conversion zone are introduced through line 12 to separation means 13 which as before may comprise any suitable arrangement of fractionators or other separating equipment. Unconverted isobutane is recycled to the conversion zone through lines 19, 21, and 20 or, if desired, through line 19, line 10, pickup zone 14 and line 20. The used catalyst phase is separated through line 15 and the major portion thereof is preferably recycled through lines 16 and 18 to the conversion zone. Hydrogen chloride separated from the reaction products may be recycled through lines 17 and 11 to the conversion zone. The desired lower boiling hydrocarbons are recovered through line 23.

In order to illustrate more completely the nature of the present invention the following specific examples are presented. However, it is in no way intended to limit the generally broad scope of the invention to the details of these examples.

*Example I*

In alkylating isobutane with ethylene in the presence of a liquid aluminum chloride-hydrocarbon complex and hydrogen chloride, approximately 10 to 15% by volume of the total alkylation product was found to boil above 65° C., i. e., above the hexane range. Of this alkylate bottoms fraction, approximately 60% boiled in the octane range. The total alkylate bottoms had an octane number of about 85 and a bromine number of <0.5. The fraction also contained appreciable quantities of combined chlorine.

Approximately 249 grams of the alkylate bottoms was charged to a mechanically agitated reaction zone of the Turbomixer type having a capacity of 1500 cc. An aluminum chloride-hydrocarbon complex catalyst was prepared outside of the system by agitating aluminum chloride, isobutane, and hydrogen chloride at a temperature of 55–60° C., and introducing ethylene slowly to the stirred mixture for a period of 6 to 8 hours. The unconverted aluminum chloride which remained in the aluminum chloride-hydrocarbon complex thus prepared was allowed to settle and the complex itself was decanted. About 206 grams of this liquid catalyst was charged to the Turbomixer reaction zone along with the alkylate bottoms.

The reaction zone was then closed up and a butane fraction was added from a weighed charging vessel. The total butane fraction thus added to the reaction zone comprised 290 grams of isobutane, 121 grams of normal butane, 4 grams of propane, and 1 gram of $C_5$ and higher hydrocarbons. From an aluminum bomb 4 grams of hydrogen chloride was also introduced into the reaction zone.

The temperature of the reaction zone was raised to 41° C. by means of an external water bath, and the stirrer was operated at 3600 R. P. M. After 2 hours of stirring the reaction was stopped and the reaction mixture removed. The vapors from the reaction zone were released into dry ice traps and the liquid material was withdrawn into a separatory funnel to separate the catalyst from the liquid hydrocarbon products.

Upon distillation and analysis of the hydrocarbon products it was found that 3 grams of propane, 226 grams of isobutane, and 120 grams of normal butane had been recovered. In addition 99 grams of pentanes, 46 grams of hexanes and 127 grams of hydrocarbon product boiling above 65° C. were also obtained. The catalyst had increased in weight to 240 grams.

It is thus evident that 122 grams of the original alkylate bottoms charged to the reaction have been converted to lower boiling and more valuable hydrocarbons. The molal ratio of isobutane consumed to alkylate bottoms charged was 0.38, and the molal ratio of isobutane consumed to alkylate bottoms consumed was 0.66. The large consumption of isobutane and the substantial absence of normal butane consumption show clearly that the reaction was not merely cracking. The total liquid product comprised on a volume basis 38% pentanes, 18% hexanes, and 44% of higher boiling and apparently unconverted alkylate bottoms. The hexane fraction contained principally 2,3-dimethylbutane along with some methyl pentane. By varying operating conditions it is possible to obtain relatively larger amounts of 2,3-dimethylbutane in the hexane fraction.

It will also be noted that pentanes (principally isopentane) were produced in substantial amounts. By altering the operating conditions of the process, it is possible to increase the relative production of hexanes and decrease the pentane production.

*Example II*

Using the same apparatus and catalyst as described in connection with Example I, alkylate bottoms from the reaction of isobutane with butylenes in the presence of sulfuric acid were employed in this experiment.

Approximately 267 grams of the alkylate bottoms (boiling above 170° C.) and 176 grams of the aluminum chloride-hydrocarbon complex were charged to the reaction zone in the manner described in Example I. About 3 grams of hydrogen chloride and a butane fraction comprising 5 grams of propane, 301 grams of isobutane, 125 grams of normal butane and 1 gram of $C_5$ and higher hydrocarbons were also added. The reaction mixture was brought up to 43° C. and stirred for 2½ hours.

Analysis of the liquid products showed that 2 grams of propane, 197 grams of isobutane, and 127 grams of normal butane were recovered unchanged. The sulfuric acid alkylate bottoms were converted to 65 grams of pentanes, 34 grams of hexanes, 29 grams of heptanes, 52 grams of octanes, 25 grams of nonanes, and 112 grams of higher boiling hydrocarbons. The catalyst layer increased in weight to 208 grams.

Here again the relatively less valuable sulfuric acid alkylate bottoms were converted to more valuable lower boiling hydrocarbons. The total liquid product comprised on a volume basis 23% pentanes, 12% hexanes, 9% heptanes, 16% octanes, 8% nonanes, and 32% of hydrocarbons boiling above 150° C. A substantial proportion of the hexane fraction consisted of 2,3-dimethylbutane. The molal ratio of isobutane consumed to alkylate bottoms charged was 1.17, and the molal ratio of isobutane consumed to alkylate bottoms consumed was 2.04.

For reference purposes the pertinent data from Examples I and II are shown in the following table:

|  | Example number | |
|---|---|---|
|  | I | II |
| Engler distillation of alkylate bottoms charged: | | |
| I. B. P., °F | [1] 208 | [2] 338 |
| 10 per cent | 216 | 361 |
| 30 | 222 | 371 |
| 50 | 230 | 385 |
| 70 | 241 | 426 |
| 90 | 282 | 529 |
| E. P., °F | 436 | 608 |
| Calculated molecular weight | 111 | 173 |
| Reaction temperature, °C | 41 | 43 |
| Stirring time, hours | 2 | 2½ |
| Materials charged, grams: | | |
| Alkylate bottoms | [1] 249 | [2] 267 |
| Propane | 4 | 5 |
| i-Butane | 290 | 301 |
| n-Butane | 121 | 125 |
| Pentane and higher | 1 | 1 |
| Catalyst | 206 | 176 |
| Hydrogen chloride | 4 | 3 |
| Total | 875 | 878 |
| Materials, recovered, grams: | | |
| Propane | 3 | 2 |
| i-Butane | 226 | 197 |
| n-Butane | 120 | 127 |
| $C_5$ hydrocarbons (20–40° c.) | 99 | 65 |
| $C_6$ hydrocarbons (40–65° C.) | 46 | 34 |
| $C_7+$ hydrocarbons (>65° C.) | 127 | [3] 218 |
| Catalyst | 240 | 208 |
| Loss | 14 | 27 |
| Total | 875 | 878 |
| Engler distillation of higher boiling product: | | |
| I. B. P., °F | 200 | 341 |
| 10 per cent | 216 | 352 |
| 30 | 229 | 366 |
| 50 | 248 | 386 |
| 70 | 280 | 418 |
| 90 | 364 | 521 |
| E. P., °F | 488 | 580 |
| Calculated molecular weight | 118 | 170 |
| Mols i-butane charged | 5.0 | 5.19 |
| Mols i-butane recovered | 3.9 | 3.39 |
| Mols alkylate bottoms charged | 2.76 | 1.54 |
| Mols alkylate bottoms recovered | 1.08 | 0.66 |
| Mols i-$C_4H_{10}$ consumed/mol alk. bottoms charged | 0.38 | 1.17 |
| Mols i-$C_4H_{10}$ consumed/mol alk. bottoms consumed | 0.66 | 2.04 |

[1] Alkylate bottoms boiling above 65° C., i. e., above hexane, obtained by interaction of isobutane and ethylene in the presence of an $AlCl_3$-hydrocarbon complex catalyst.
[2] Alkylate bottoms boiling above 170° C. obtained by interaction of isobutane and butylenes in the presence of sulfuric acid.
[3] Contains 29 grams $C_7$, 52 grams $C_8$, 25 grams $C_9$, and 112 grams $C_{10+}$.

I claim as my invention:

1. A process for the production of more valuable lower boiling hydrocarbons from relatively high boiling isoparaffin-olefin alkylation products which comprises reacting said relatively high boiling alkylation products with isobutane in the presence of an aluminum chloride-hydrocarbon complex.

2. In the alkylation of isoparaffins with olefins in the presence of a suitable alkylation catalyst wherein there are produced alkylation products of desired boiling range and products boiling above the desired range, the improvement which comprises reacting the higher boiling alkylation products with isobutane in the presence of an aluminum chloride-hydrocarbon complex and hydrogen chloride to produce lower boiling and more valuable paraffinic hydrocarbons.

3. A process for the conversion of less valuable isoparaffin-olefin alkylation products boiling above the gasoline range to lower boiling and more valuable hydrocarbons which comprises reacting the higher boiling alkylation products with isobutane in the presence of an aluminum chloride-hydrocarbon complex and hydrogen chloride.

4. The process of claim 2 wherein said higher boiling alkylation products boil above about 160° C.

5. In a process for the alkylation of isobutane with olefins in the presence of sulfuric acid, the method of converting high boiling alkylation products to lower boiling and more valuable hydrocarbons which comprises reacting the alkylation products boiling above about 160° C. with isobutane in the presence of an aluminum chloride-hydrocarbon complex and hydrogen chloride.

6. In a process for the alkylation of isobutane with olefins in the presence of hydrogen fluoride, the method of converting high boiling alkylation products to lower boiling and more valuble hydrocarbons which comprises reacting the alkylation products boiling above about 160° C. with isobutane in the presence of an aluminum chloride-hydrocarbon complex and hydrogen chloride.

7. In the alkylation of isobutane with ethylene in the presence of a suitable alkylation catalyst to produce valuable $C_6$ hydrocarbons wherein higher boiling alkylation products are also produced, the improvement which comprises reacting the alkylation products boiling above about 65° C. with isobutane in the presence of an aluminum chloride-hydrocarbon complex and hydrogen chloride to form additional quantities of $C_6$ hydrocarbons including 2,3-dimethylbutane.

8. A process for the production of valuable $C_6$ hydrocarbons including 2,3-dimethylbutane which comprises reacting relatively high boiling alkylation products from an isoparaffin-olefin alkylation process with isobutane in the presence of an aluminum chloride-hydrocarbon complex and hydrogen chloride.

9. The process of claim 1 wherein said aluminum chloride-hydrocarbon complex is prepared by contacting a paraffin, an olefin, hydrogen chloride, and aluminum chloride under alkylating conditions.

10. The process of claim 1 wherein said reaction is carried out at a temperature of from about 10° C. to about 100° C. and under sufficient pressure to maintain the reactants in substantially the liquid phase.

RALPH B. THOMPSON.